United States Patent
Bhat et al.

(10) Patent No.: US 9,332,556 B2
(45) Date of Patent: *May 3, 2016

(54) WHITE SPACE ACCESS IN MOBILE COMMUNICATION NETWORKS

(71) Applicant: Vodafone IP Licensing Limited, Berkshire (GB)

(72) Inventors: Prakash Bhat, Berkshire (GB); Ralf Irmer, Berkshire (GB); Benedikt Noethen, Berkshire (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/488,765

(22) Filed: Sep. 17, 2014

(65) Prior Publication Data

US 2015/0133138 A1  May 14, 2015

Related U.S. Application Data (63) Continuation of application No. 13/095,137, filed on Apr. 27, 2011, now Pat. No. 8,855,708.

(30) Foreign Application Priority Data

Apr. 27, 2010 (GB) .................................. 1007012.6

(51) Int. Cl.
| | |
|---|---|
| *H04M 1/00* | (2006.01) |
| *H01Q 11/12* | (2006.01) |
| *H04B 1/04* | (2006.01) |
| *H04W 72/08* | (2009.01) |
| *H04W 72/02* | (2009.01) |
| *H04W 24/04* | (2009.01) |
| *H04W 16/14* | (2009.01) |
| *H04W 72/04* | (2009.01) |
| *H04W 88/06* | (2009.01) |

(52) U.S. Cl.
CPC ............ *H04W 72/082* (2013.01); *H04W 24/04* (2013.01); *H04W 72/02* (2013.01); *H04W 16/14* (2013.01); *H04W 72/042* (2013.01); *H04W 88/06* (2013.01)

(58) Field of Classification Search
CPC .......... H03C 3/222; H01P 1/262; H03B 5/10; H04W 88/06; H04W 48/16
USPC ................ 455/120, 552.1; 370/241, 329, 445
See application file for complete search history.

(56) References Cited

U.S. PATENT DOCUMENTS 8,730,990 B2 * 5/2014 Ghosh et al. .................. 370/445
8,855,708 B2 * 10/2014 Bhat et al. .................. 455/552.1

(Continued)

*Primary Examiner* — William D Cumming
(74) *Attorney, Agent, or Firm* — B. Aaron Schulman, Esq.; Stites & Harbison, PLLC (57) ABSTRACT

A method of operating a mobile telecommunications device including cellular communication means operable to communicate with a cellular telecommunications network base station and white space communication means operable to communicate with a non-cellular white space access point, the method including determining the availability of white space and selectively enabling white space communication in dependence upon the determination. Controlling transmission of user data in the white space may be by exchanging control data with the cellular telecommunications network base station such that the control data controls the transmission of user data in the white space. White space communication need not be implemented in uplink and may be used in the downlink alone.

27 Claims, 5 Drawing Sheets

(56) References Cited

U.S. PATENT DOCUMENTS

| | | | |
|---|---|---|---|
| 8,861,452 B2 * | 10/2014 | Barbieri et al. | 370/329 |
| 2011/0250858 A1 * | 10/2011 | Jain et al. | 455/120 |
| 2011/0319129 A1 * | 12/2011 | Bhat et al. | 455/552.1 |
| 2012/0039284 A1 * | 2/2012 | Barbieri et al. | 370/329 |
| 2013/0070605 A1 * | 3/2013 | Ghosh et al. | 370/241 |

* cited by examiner

WHITE SPACE ACCESS IN MOBILE COMMUNICATION NETWORKS

CROSS-REFERENCE TO RELATED APPLICATION

This application is a continuation application of U.S. patent application Ser. No. 13/095,137, filed Apr. 27, 2011, said application herein incorporated by reference.

TECHNICAL FIELD

The present invention relates to a mobile telecommunications device including cellular communication means operable to communicate with a cellular telecommunications network base station and white space communication means operable to communicate with a non-cellular white space access point. The present invention also relates to a method of operating such a mobile telecommunications device and a telecommunication system.

BACKGROUND TO THE INVENTION

Cellular telecommunications devices, such as those operating in accordance with the GSM, UMTS, HSPA, WiMAX or LTE Standards communicate wirelessly with base stations of a cellular telecommunications network using a cellular telecommunications bearer. Known mechanisms allow the mobile devices to move between the base stations without interruption of telecommunications services and without requiring user interaction. The radio spectrum used for cellular telecommunications is licensed for use by an appropriate governmental authority, such as Ofcom in the UK or the FCC in the USA. These mobile broadband networks have been very successful in delivering broadband services such as internet access, and in providing coverage for a very large proportion of the population and area of a country. As indicated above, these networks use licensed radio spectrum bands; however, the available bandwidth is very limited.

There are also technologies which use unlicensed radio spectrum bands such as WiFi or Bluetooth, but their range and coverage is very limited (they are used predominantly for indoor communications). WiFi mobile telecommunications devices communicate wirelessly with one or more WiFi access points. The radio spectrum used for WiFi communications uses a non cellular telecommunications bearer and is unlicensed by a governmental authority.

Further, there are non-cellular radio spectrum bands that are licensed to license-holders, which do not operate a service all the time everywhere in a country, such as TV stations or certain military applications. These license-holders are referred to herein as primary license-holders. So-called "white spaces" are parts of this non-cellular licensed spectrum which are unused in a certain geographical area for a certain time period.

Release of these underused white space frequency bands for other uses (without geographical or time limitations) would be highly advantageous. Services currently using these underused white space frequency bands could be moved to other frequencies. However, currently, there are no proposals to change the use of frequency spectrum in this way.

Regulators such as the FCC in the US and Ofcom in the UK have started to develop novel regulatory concepts for such white space frequency bands which try to make use of the spectrum whilst protecting the primary licence holder. Using white spaces efficiently, avoiding interference between different devices using white spaces and providing reliable, predictable services is technically very challenging. Several research projects and standardization bodies such as IEEE P.1900 and IEEE 802.22 have suggested technical concepts which use these white spaces, but these concepts have not been applied commercially since they have many technical difficulties.

The use of white space spectrum by communications devices is sometimes also called cognitive radio, as such devices have to be aware of their environment to determine whether they are allowed to transmit or not. There are two principle methods to determine this:

Geolocation database: The white space device consults a geolocation database to see whether it is allowed to use white space spectrum within a certain area for a certain period of time. The white space device has to determine its location with a certain accuracy (e.g. using GPS), and the database has to be maintained, e.g. by the regulator or a third party. Before a white space device can use the white space spectrum, it must reliably communicate with the geolocation database.

Cognition and sensing: The white space device measures the white space spectrum it wishes to use to establish if this spectrum is already used in its vicinity or not. This requires a very sensitive receiver which is expensive, or modification of the primary (licensed) user signal with beacons which is not very practicable. Other possibilities are cooperative sensing, where multiple white space devices work together to determine if the spectrum is occupied. Spectrum sensing takes a long time, and requires high power consumption.

Figure 1:
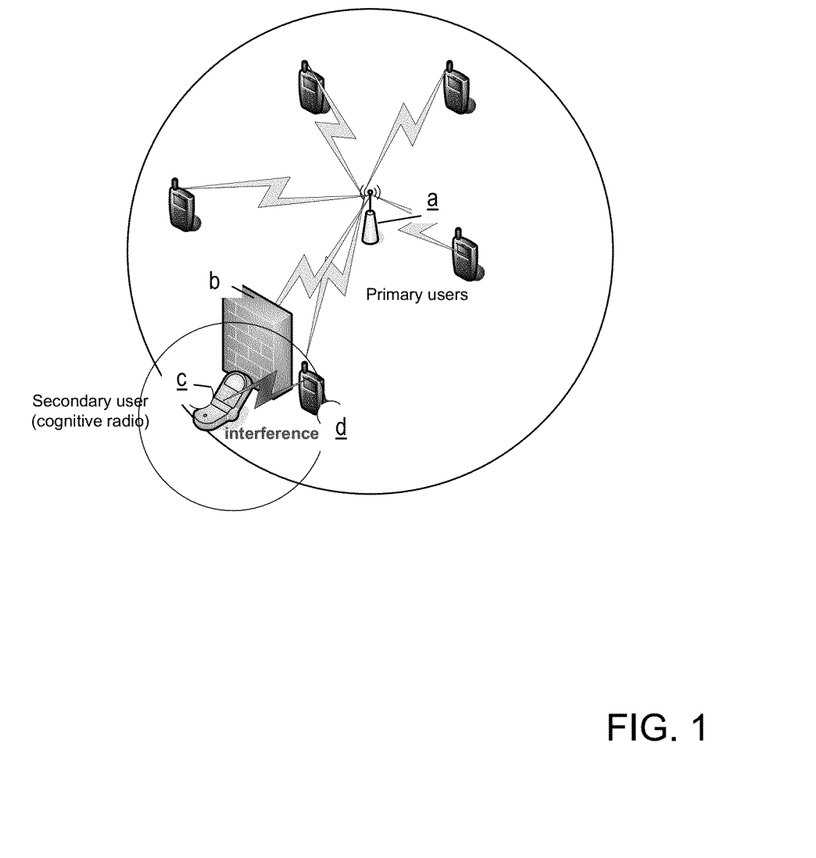
FIG. 1 is a schematic drawing for explaining a known difficulty with sensing white space availability.

A difficulty with accurate sensing will briefly be described with reference to FIG. 1, and is the so-called hidden node problem. A primary (licensed) signal transmitter (and optionally also receiver) a, hereinafter referred to as a primary user access point, AP, is shown. An obstacle b is within the coverage area. Behind the obstacle b a cognitive radio device c measures the radio spectrum environment. At the device c the received signal strength of the primary user AP a is very low, because of the obstacle b between the primary user AP a and the cognitive device c. To be able to detect the low primary user signal, a sensitive radio is needed. If the cognitive radio device c is not capable of detecting the signal of the primary user AP a, it will then incorrectly determine that the spectrum is unused and may begin using this spectrum—thereby leading to interference at a primary receiver white space device d when it attempts to communicate with the primary user AP a.

This problem is especially severe in the uplink, i.e. the transmission of the white space device d (or cognitive radio device c) to the primary user AP a. Interference can be caused by the cognitive device c to white space device d. One example could be a laptop or smartphone with a white space radio (as cognitive radio device c), which could disrupt a TV receiver (as white space device in the same or a neighbouring room.

A communication system for operation in white space spectrum may use either paired (Frequency Division Duplex, FDD) or unpaired (Time Division Duplex, TDD) spectrum. Usage of paired spectrum would require a spectrum allocation by a regulator which would be difficult to obtain. Unpaired operation (TDD) may cause severe interference within the same white space channel and in neighbouring channels when the uplink from a white space device is colliding with the downlink of a close-by white space device either using the same communications system, or another communications system also using white space spectrum.

Time synchronization of different devices of one or multiple systems could partially mitigate such interference issues, but not completely.

Some white space communications systems known in the state-of-the art use a so-called cognitive pilot channel to exchange information between white space APs and devices. However, this cognitive pilot channel needs to be agreed between different systems, needs to be available everywhere, and needs to be reliably found by all devices within the potential white space channels. This is incompatible with the concept of cognitive radio and white spaces, with dynamic allocation of spectrum. Also, the cognitive pilot channel would have to be standardized everywhere in the world in order to enable mass-market products, which is very unlikely.

Another issue with existing white space/cognitive radio devices is that the location information and sensing signal information is usually not very accurate, which requires that geographical exclusion zones are created around primary spectrum users, so no other use of the spectrum is allowed in that exclusion zone. Also, if a white space enabled mobile device is granted access to white space, the area over which access is exclusively granted needs to be made very large. These factors limit the efficient usage of white space spectrum in a certain country or area.

Bonding different carriers together, i.e. consecutive and non-consecutive carrier aggregation is known in principle for OFDM systems like LTE. However, these concepts operate in licensed bands and do not address white-space specifics. Also, they use usually only either FDD or TDD.

SUMMARY OF THE INVENTION

According to a first aspect of the present invention, there is provided a mobile telecommunications device including cellular communication means operable to communicate with a cellular telecommunications network base station, white space communication means operable to communicate with a non-cellular white space access point, and control means operable to determine the availability of white space and to selectively enable white space communication in dependence upon the determination.

The device may control transmission of user data in the white space by exchanging control data with the cellular telecommunications network base station, the arrangement being such that the control data controls the transmission of user data in the white space.

The device may use white space communication only in the downlink.

The device may exchange data relating to a communication session via both the cellular telecommunications network base station and the non-cellular white space access point.

The device may access a database of white space availability via the cellular telecommunications network base station.

Embodiments of the invention provide a system and method to utilize white space spectrum for broadband communications. The embodiments combine existing wireless wide area technologies (such as LTE, HSPA, GSM, UMTS or WiMAX) which use licensed cellular telecommunication bands with technology utilizing spectrum bands in white spaces. A device (e.g. laptop, phone, machine or vehicle) may use the cellular wide area technology as usual, and the additional white space spectrum may be utilized to increase the data rates significantly, in areas and at times this is possible. The white space spectrum may be used as a "data rate boost" for the device usually operating with an existing cellular wide area technology.

The embodiments also make use of the current infrastructure of a cellular wide area communications network, with base stations in known locations. The cellular wide area network may be used as a reliable communications channel to inform white space devices about available spectrum channels. A base station could be a macro base station on a tower or building, a pico cell or a femto cell.

The wide area communications network can also be used to coordinate white space devices in a certain area and provide mechanisms for multiple access, time and frequency synchronization.

This invention is enables the usage of additional free spectrum frequencies, e.g. TV white spaces. The possible white spaces may be used in downlink only, which will allow time synchronisation.

The present invention also provides a method of operating a mobile telecommunications device and a telecommunications system as defined in the claims.

BRIEF DESCRIPTION OF THE DRAWINGS

For a better understanding of the present invention embodiments will now be described by way of example, with reference to the accompanying drawings, in which.

DETAILED DESCRIPTION OF EMBODIMENTS OF THE INVENTION

Key elements of a mobile or cellular telecommunications network, and its operation, will now briefly be described with reference to FIG. 2.

Each base station (BS) corresponds to a respective cell of its cellular or mobile telecommunications network and receives calls from and transmits calls to a mobile device in that cell by wireless radio communication in one or both of the circuit switched or packet switched domains. Such a subscriber's mobile device is shown at 1. The mobile device may be a handheld mobile telephone, such as a smart phone, and includes a processor 21 and a transceiver 19.

In a GSM (2, 2.5 G) mobile telecommunications network, each base station comprises a base transceiver station (BTS) and a base station controller (BSC). A BSC may control more than one BTS. The BTSs and BSCs comprise the radio access network.

In a UMTS (3G) mobile telecommunications network, each base station comprises a node B and a radio network controller (RNC). An RNC may control more than one node B. The node B's and RNC's comprise the radio access network.

In a proposed LTE (4G) mobile telecommunications network, each base station comprises an eNode B (eNB). The base stations are arranged in groups, and each group of base stations is controlled by a Mobility Management Entity (MME) and a User Plane Entity (UPE).

Conventionally, the base stations are arranged in groups and each group of base stations is controlled by one mobile switching centre (MSC), such as MSC 2 for base stations 3, 4 and 5. As shown in FIG. 2, the network has another MSC 6, which is controlling a further three base stations 7, 8 and 9. In practice, the network will incorporate many more MSCs and base stations than shown in FIG. 2. The base stations 3, 4, 5, 7, 8 and 9 each have dedicated connection to their MSC 2 or MSC 6—typically a cable connection.

The MSCs 2 and 6 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 2 and 6. The SGSNs 16, 18 are equipped with an equivalent to the VLRs 11, 14 used in the packet switched domain.

Each subscriber to the network is provided with a smart card or SIM 20 which, when associated with the user's mobile device 1 identifies the subscriber to the network. The SIM card is pre-programmed with a unique identification number, the "International Mobile Subscriber Identity" (IMSI) that is not visible on the card and is not known to the subscriber. The subscriber is issued with a publicly known number, that is, the subscriber's telephone number, by means of which callers initiate calls to the subscriber. This number is the MSISDN.

The network includes a home location register (HLR) 10 which, for each subscriber to the network, stores the IMSI and the corresponding MSISDN together with other subscriber data, such as the current or last known MSC or SGSN of the subscriber's mobile device 1.

When mobile device 1 is activated, it registers itself in the network by transmitting the IMSI (read from its associated SIM card 20) to the base station 3 associated with the particular cell in which the device 1 is located. In a traditional network, the base station 3 then transmits this IMSI to the MSC 2 with which the base station 3 is registered. In a network using the functionality described in 3GPP TS 23.236, the base station follows prescribed rules to select which MSC to use, and then transmits this IMSI to the selected MSC.

MSC 2 now accesses the appropriate storage location in the HLR 10 present in the core network 22 and extracts the corresponding subscriber MSISDN and other subscriber data from the appropriate storage location, and stores it temporarily in a storage location in a visitor location register (VLR) 14. In this way, therefore the particular subscriber is effectively registered with a particular MSC (MSC 2), and the subscriber's information is temporarily stored in the VLR (VLR 14) associated with that MSC.

When the HLR 10 is interrogated by the MSC 6 in the manner described above, the HLR 10 additionally performs an authentication procedure for the mobile device 1. The HLR 10 transmits authentication data to the MSC 2 in "challenge" and "response" forms. Using this data, MSC 6 passes a "challenge" to the mobile device 1 through base station 7. Upon receipt of this data, the mobile device 1 passes this data to its SIM and produces a "response". This response is generated using an encryption algorithm on the SIM and a unique key Ki on the SIM. The response is transmitted back to the MSC 6 which checks it against its own information for the subscriber which checks it against information that it has obtained for that subscriber from the HLR 10 in order to complete the authentication process. If the response from the mobile device 1 is as expected, the mobile device 1 is deemed authenticated. At this point the MSC 6 requests subscription data from the HLR 10. The HLR 10 then passes the subscription data to the VLR 14.

The authentication process will be repeated at regular intervals while the mobile device 1 remains activated and can also be repeated each time the mobile device 1 makes or receives a call, if required. This authentication process confirms the identity of the user to the network, so the user can be charged for telecommunications services.

Each of the MSCs of the network (MSC 2 and MSC 6) has a respective VLR (14 and 11) associated with it and operates in the same way as already described when a subscriber activates a mobile device 1 in one of the cells corresponding to one of the base stations controlled by that MSC.

When the subscriber using mobile device 1 wishes to make a call, they enter the telephone number of the called party in the usual manner. This information is received by the base station 3 and passed on to MSC 2. MSC 2 routes the call towards the called party. By means of the information held in the VLR 14, MSC 2 can associate the call with a particular subscriber and thus record information for charging purposes.

The functionality just described may also apply to the proposed LTE mobile telecommunications network, with its eNode Bs performing the functionality of the base stations and the MME/UPE performing the functionality of the MSCs/VLRs. It is also to be appreciated that the functionality just described is one example of a network in which the embodiments of the invention may be implemented.

From the description above, it will be understood that the coverage area of a mobile telecommunications network is divided into a plurality of cells, each of which is served by a respective base station.

GSM, UMTS and LTE networks operating in the manner generally described above are referred to as "cellular" telecommunications systems. Such systems generally operate in accordance with standards specified by ETSI. Such cellular telecommunications networks generally cover a large geographical area (typically a major portion of a country) and provide substantially continuous coverage through a multiplicity of cells spread over the geographical coverage area. The cells may be macro cells, pico cells or femto cells. Movement between the cells when a mobile device is in an inactive or idle mode is performed by cell reselection. Movement between the cells whilst the mobile device is in the active state is facilitated by a handover procedure, which allows the communication session to be continued as the mobile device moves through a plurality of cells. WiMAX is another example of a cellular telecommunications system. Cellular telecommunications systems communicate using a cellular telecommunication bearer. Cellular telecommunications systems use licensed radio spectrum.

Cellular telecommunications networks provide a separation of the "control plane" and the "user plane". The control plane performs the required signalling, and includes the relevant application protocol and the signalling bearer for transporting the application protocol messages. Among other things, the application protocol is used for setting up the radio access bearer in the radio network layer. The user plane transmits data traffic and includes data streams and data bearers for the data streams. The data streams are characterised by one or more frame protocols specified for that interface.

Generally speaking, the user plane carries data for use by a receiving terminal—such as data that allows a voice or picture to be reproduced—and the control plane controls how the data is transmitted. The user plane and control plane of LTE are described in Specification 3GPP TR 36.814—which is fully incorporated herein by reference—see particularly Section 5.

Figure 2:
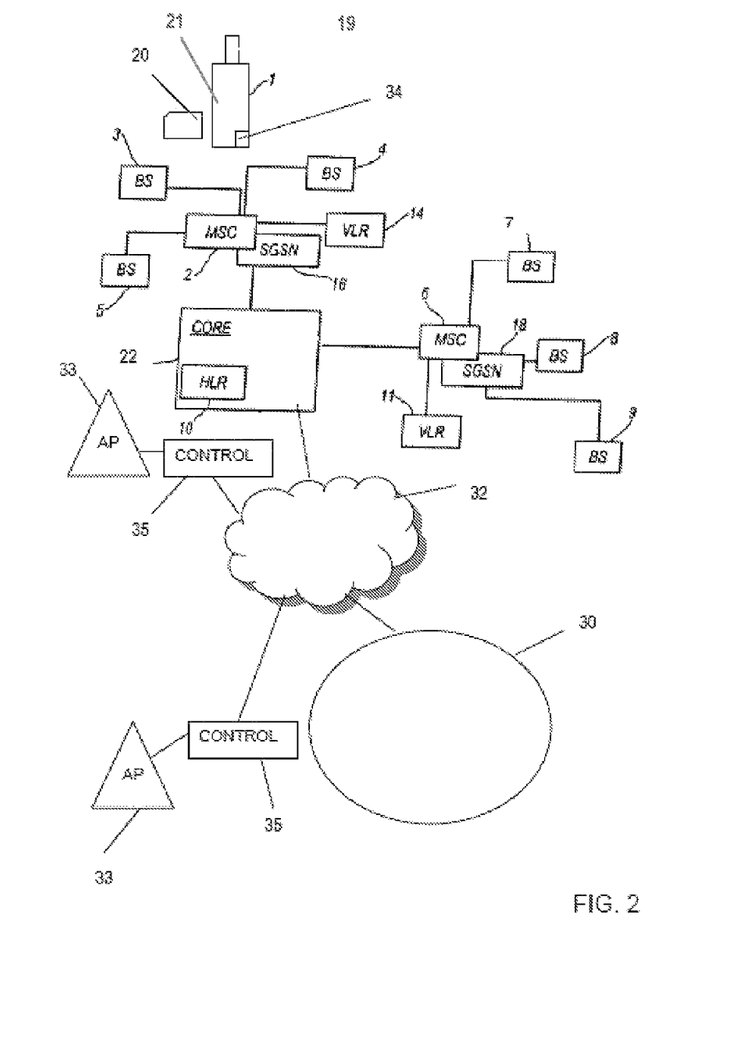
FIG. 2 is a diagrammatic drawing of key elements of a network including a mobile telecommunications network and white space access points.

The network of FIG. 2 also includes white space access points 33. These white space access points are controlled via respective controllers 35 that are connected to the internet 32.

In an example embodiment of the invention, the cellular wide area network technology is LTE (an OFDM technology), and for the white space channel existing LTE technology elements are reused as much as possible. That is, LTE data structures and protocols are used to transmit data in the white space frequencies. This allows an LTE device to transmit and/or receive in white space frequencies with minimal modification. Known mechanisms of carrier aggregation may be reused (for example, as described in Specification 3GPP TR 36.814, which is fully incorporated herein by reference). That is, data transmitted by LTE carrier and white space carrier may be combined using the principles describes in Specification 3GPP TR 36.814, further details of which are provided below. In the example depicted in FIG. 3, LTE is running at 800 MHz (alternatively 1.8 GHz or 2.6 GHz or another frequency can be used), which is called hereinafter main LTE band 41, 42. The white space bands 43, 44, 45 are around 600 MHz in this example. In some countries, white space spectrum is between 54 MHz to 698 MHz, in others 470 MHZ to 790 MHz. The white space spectrum is divided into channels of a certain bandwidth (here, 6 MHz is selected, other countries have for instance 8 MHz). In this example, three white space bands 43, 44, 45 are available in this particular geographical area, where two bands 43, 44 are adjacent and one band 45 is non-adjacent. To simplify the example, only the band 43 is utilized. In an alternative example, these bands could be bonded together.

Figure 3:
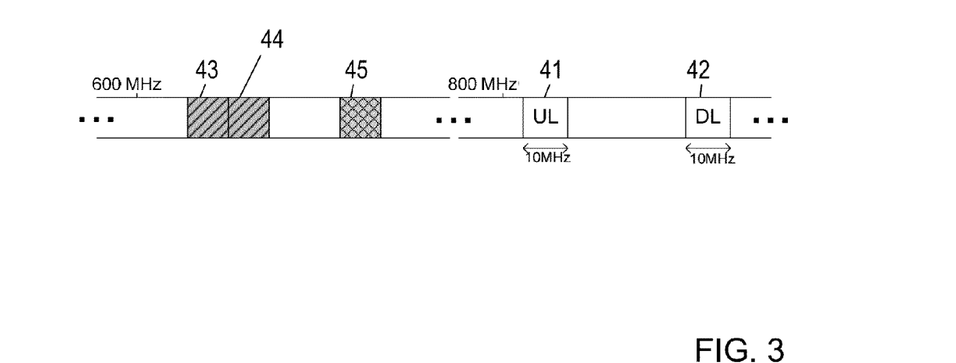
FIG. 3 shows the frequency bands used for LTE and in the white space.

The communications within the main LTE band 41 and 42 is according to the LTE Standard—for example, as described in Specification 3GPP TR 36.814, which is fully incorporated herein by reference, with some modifications—which are preferably minimal.

Figure 4A:
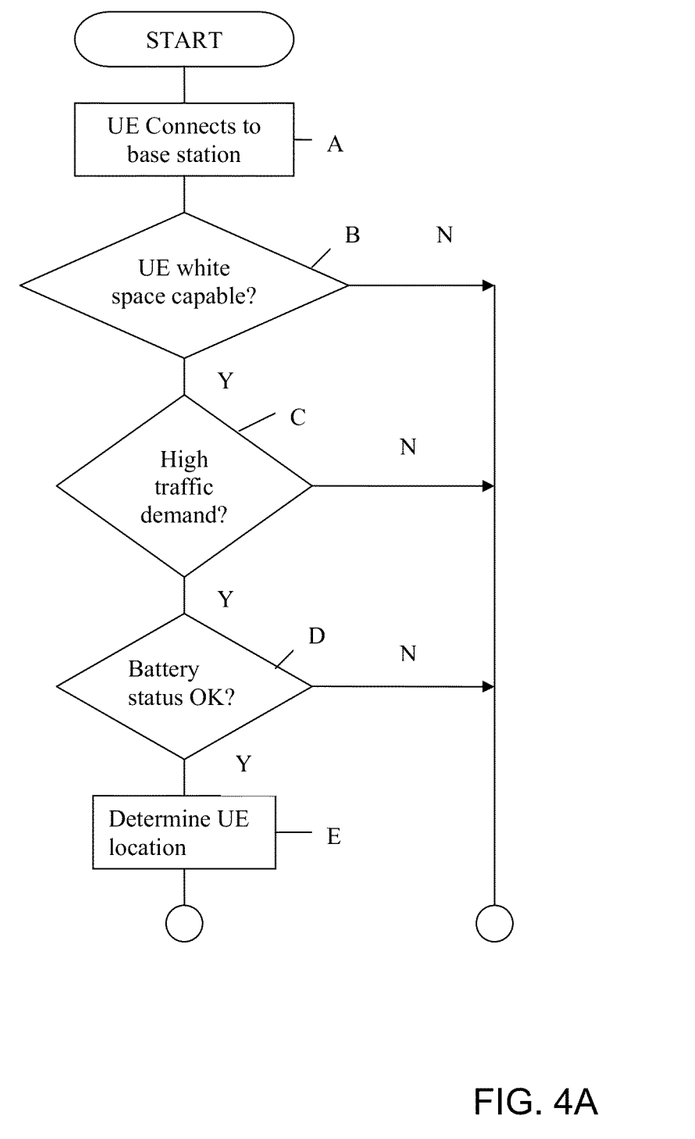
FIGS. 4A and 4B are a flow chart showing the steps performed according to the embodiment of the invention.
Figure 4B:
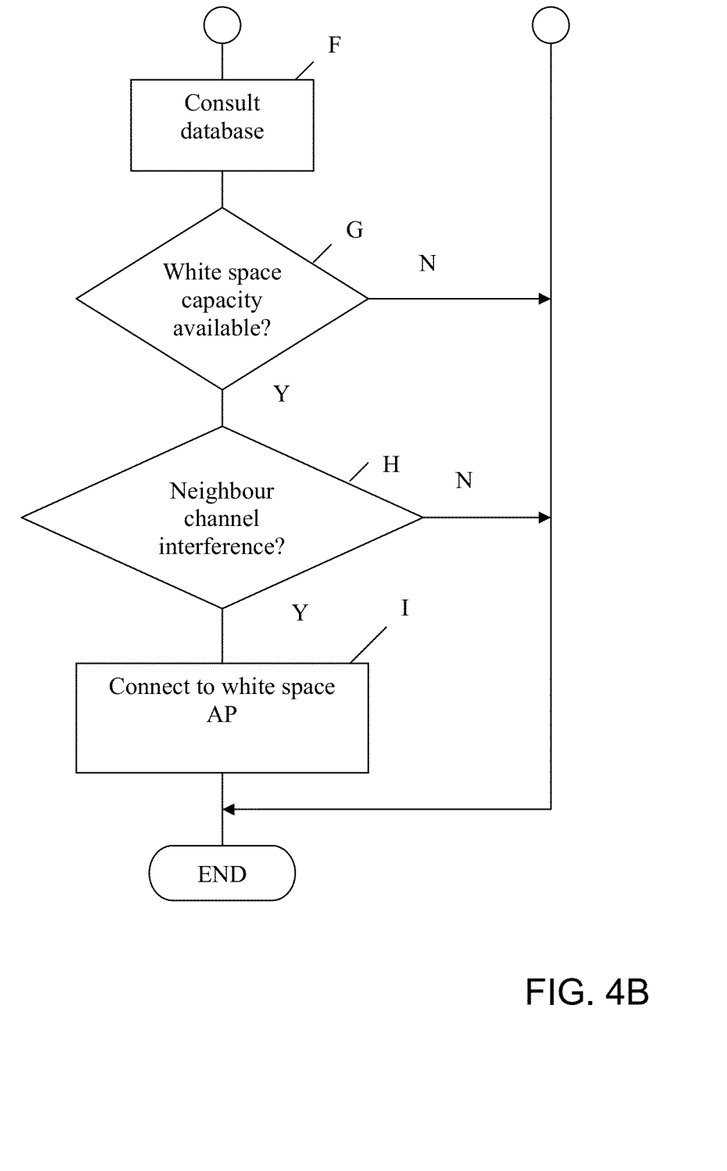

The procedures performed will now be described with reference to the flow chart of FIG. 4.

At step A the mobile device (UE) 1 registers with an LTE base station 3 in a conventional manner. The mobile device 1 is then able to send and receive communications (e.g. voice calls or packet data) via the LTE base station 3. LTE is used for both the control plane and the user plane at this stage.

At step B it is determined whether the mobile device 1 is capable of communicating using white space spectrum. The mobile device 1 may be provided with a white space communication module 34 for this purpose. This module allows the mobile device 1 to send and/or receive data at the white space frequencies and to interpret and process white space data. If the device 1 is not capable of communicating using white space spectrum, then the procedure ends.

If the device 1 is capable of communicating using white space spectrum, it is then determined at step C whether the mobile device 1 has a requirement for high speed data traffic. For example, video streaming requires high speed data, and the additional bandwidth provided by white space spectrum would be advantageous for video streaming. On the other hand, if the mobile terminal 1 is just periodically sending/receiving emails, then additional bandwidth provided by white space spectrum would not be particularly advantageous, and any advantages of the higher bandwidth would be offset by increased power consumption by the mobile terminal 1. If the mobile device 1 does not have a requirement for high speed data traffic, the procedure ends.

On the other hand, if the mobile device 1 has a requirement for high speed data traffic, then at step D the power supply status of the mobile device 1 is evaluated. For example, if the mobile device 1 is operating on battery power, the level of depletion of the battery is determined. If the battery is in a depleted state, for example with less than 20% capacity remaining, there is a risk that communicating using the white space spectrum will exhaust the battery as generally communication using the white space spectrum will consume more power than communicating using LTE. If the battery is in a depleted state, then the procedure ends.

If, on the other hand, at step D it is determined that the battery is not depleted, then at step E the device location is determined. For example, this may be done by using GPS, cell triangulation, cell ID or any other suitable means.

At step F the mobile device 1 consults a white space geolocation database 30 via the LTE base station 3, network core 22 and internet 32. A list of available white space channels at the location of the mobile device 1 is returned by the database 30 (via the internet 32, network core 22 and the LTE base station 3). The database 30 may be maintained by a third party. The database stores the available (unused) white space spectrum at each location in an area (for example a country such as the United Kingdom). Information that allows use of the white space spectrum may be included in the database for sending to the mobile terminal 1 which facilitates connection by the mobile terminal 1 to an appropriate white space access point 33. For example, the database 30 may store the frequency bands used in the white space by a particular white space access point 33. The database may even record the scheduled usage of such frequency bands over particular time periods, i.e. hours or days of the week or dates.

As an alternative to steps E and F, the mobile device 1 or white space access point 33 may measure the white space spectrum in the vicinity of the mobile device/access point to establish if this spectrum is used or not.

In yet another alternative to steps E and F, the information from the spectrum database, the measurements of white space spectrum by mobile device 1 and other mobile devices in this area, and access point 33 and other access points in this area are combined using mechanisms known as "cooperative sensing" to establish if this spectrum is used or not.

At step G it is assessed whether white space spectrum is available. If white space spectrum is not available, then the procedure ends.

On the other hand, if it is determined at step G that white space spectrum is available, then at step H it is assessed whether using white space will cause interference in neighbouring channels. The bandwidth usage may be adapted to reduce interference—e.g. 5 MHz out of 7 MHz may be used. If it is assessed that using the white space will cause interference (even with adapted bandwidth usage), then the procedure ends.

If at step H it is determined that using the white space spectrum will not cause interference, then at step I a connection between the mobile device and the white space access point 33 is established.

The access point 33 may transmit pilot signals in the white space channel 43 that are detectable by the white space module 34 of the mobile device 1 and which enable the module 34 to analyse the white space properties and calculate white space status information.

The uplink (UL) of the main LTE band 41 is modified to carry additional status information about the white space band 43, such as Channel Quality Indicator (CQI), acknowledgements of received packets (ACK/NACK) and Reference Signal Received Quality (RSRQ). This status information corresponds to the like-named status information used in LTE. This information is based on measurements in the device 1 by the module 34 of the white space. This status information is used to control the transmission of data between the AP 33 and the device 1. The status information is transmitted to the controller 35 of the AP 33 via the base station 3, network core 22 and the internet 32. This allows, for example, the AP 33 to retransmit data packets that are not received by the device 1. By having the level of control provided by LTE, the data transmission in the white space does not need to be as robust, as specific packets can be re-transmitted in the white space on request transmitted via LTE.

In the downlink (DL) of the main LTE carrier 42, control information is signalled for the downlink white space band 43. This control information enables the PAPR (Peak-to-Average Power Ratio, the peak divided by the Root Mean Square (RMS) of the waveform) in the UE to be kept to a minimum. Transmission power per control channel is not compromised. The Channel state information feedback in the control information should be similar to that for DL COMP. DL COMP is Downlink Cooperative Multipoint, or Cooperative MIMO.

This embodiment does not provide for UL power control for white space band, however UL power control is entirely compatible with other possible embodiments of the invention.

In this embodiment, user data is transmitted using the white space spectrum in the uplink between the mobile device 1 and the AP 33, and in the downlink between the AP 33 and the mobile device 1. This user data may be content consumed by the user, such as voice call data, web pages, etc. The user data is equivalent to user plane data in a cellular network. User data may also be transmitted using the LTE spectrum. The use of the white space spectrum increases the transmission/reception data rate. The user content can be delivered by means of unicast, multicast or broadcast. To simplify the description of this embodiment, only unicast data is considered in detail: the reader will appreciate that the arrangement described may easily be extended to multicast and broadcast delivery.

In this embodiment control data is transmitted using the using the LTE spectrum in the uplink between the mobile device 1 and the base station 3, and in the downlink between the base station 3 and the mobile device 1. The control data controls the communication of the user data but is not consumed by the user, and is equivalent to the control plane in a cellular telecommunications network.

The LTE spectrum and communication protocols are therefore used to control transmission of user data in the white space.

In an alternative embodiment of the invention, cross carrier scheduling is used and the control channel from the spectrum which is most robust is used for downlink control signalling. It may be the case that the white space bands may be better considering the favourable propagation condition due to lower frequency or the main LTE band may be more robust due to better managed radio resource by the infrastructure point. In this embodiment:—

- This allows for more opportunity for discontinuous transmission (DRX) as the terminal is not required to listen to the white space band if is in DRX for the main LTE band. This increases the UE power saving.
- Mobility procedure and mobility measurements are to be based on main LTE band
- Unlike an LTE component carrier, the white space band shall have no common reference signal but only Channel State Information Reference Signal (CSI-RS), which is sparse in time and frequency) for channel estimation to reduce reference signal overhead.
- The same cell identifier (CELL-ID) and hence same scrambling code for CSI-RS shall be used in the LTE main band and the white space band In a favourable embodiment of the invention, the white space spectrum is only used in the downlink from an AP 33 to a mobile device 1. For uplink purposes (i.e. uplink data and control signalling, and feedback necessary for efficient downlink communications), the LTE wide area network uplink channel is used. Using white spaces only for downlink purposes has the following advantages:—

- Usually, most data applications need most data bandwidth in the downlink from the network (e.g. internet) to the mobile device 1. Therefore most fixed line technologies (ADSL) and wireless technologies (e.g. HSPA, LTE) have a higher bandwidth in the downlink. Thus the "bandwidth boost" is only necessary for the downlink.
- The white space system does not need to use paired bands (FDD), and it does not require the switching between uplink and downlink necessary for TDD operation in unpaired bands.
- The mobile device 1 can be implemented much more cheaply, be smaller and have lower power consumption as it needs only to receive in white space bands and does not need to transmit in white space bands. Building a transmitter capable of covering bands within that potentially huge white space spectrum bandwidth is difficult.
- Some interference issues, such as the hidden node problem described in relation to FIG. 1 or interference to nearby devices, only occur in the uplink. Also, interference can be much better localized and mitigated or coordinated if transmission is only provided from the white space network infrastructure.
- An operator operating the white space bands has full control of the usage of white space bands, limiting the risk of unintended behaviour of mobile devices 1, and giving the operator the opportunity to upgrade or exchange the white space system, which would be more difficult if mobile devices 1 would be allowed to transmit.
- Time and frequency synchronization of white space transmission is simplified, e.g. by using synchronization methods between network infrastructure elements such as IEEE 1588 or GPS.

It is noted that sounding Reference Signal (SRS) based uplink channel estimation, scheduling, beamforming etc. cannot be performed on the white space band. Explicit CSI (Channel State Information) needs to be fed back on the main LTE band instead.

New bandwidth's may need to be defined (e.g. 6 MHz or 8 MHz) to fully utilize the cognitive radio if the cognitive radio band cannot be served with combination of the available 6 bandwidth defined in LTE Rel-8 (1.4 MHz, 3 MHz, 5 MHz, 10 MHz, 15 MHz & 20 MHz).

One way to utilize the available bandwidth to its maximum extent whilst providing sufficient guard bands to protect other systems and users in neighbouring bands is to puncture the OFDM spectrum subcarriers, i.e. use only a subset of subcarriers for transmission. This approach is simplified since control channels are carried in the main LTE carrier. Puncturing of subcarriers could be obtained through restrictions in the scheduler of the base station.

To enable the usage of multiple devices from the infrastructure point in the white space band 43, multiple access functionality (MAC) and a scheduler needs to be implemented in the infrastructure point AP 33.

The data in the LTE main band 41,42 and the white space band 43 can be joined together on different levels IP packet layer, i.e. the bearers are completely independent PDCP, RLC or MAC layer A mobile device 1 in connection to infrastructure AP 33 can also mange spectrum for other mobile devices in the vicinity of mobile device 1.

Base stations are located on roof tops, which will increase the reliability of detection of primary users. So the probability of interference will be reduced.

The knowledge and usage about the free frequency spaces (white spaces) will increase the downlink data throughput. It will also provide time synchronization and high coverage.

With the use of the database of the spectrum usage, coordinated multi operated network sharing is possible. The usage of additional spectrum for downlink will reduce the probability of interference. The base station can access the spectrum database very easily and the spectrum could be shared between operators. Embodiments may provide:—
- time synchronization
- high coverage
- supported peak rate can be increased
- better detection of primary users (because of locations of antennas)
- better information exchange about current spectrum usage
- larger frequency diversity
- multi operator (network sharing) possible Discussion of Standard 3GPP TR 36.814

Section 5 of this Standard discusses support of wider bandwidth. LTE-Advanced extends LTE Rel.-8 with support for Carrier Aggregation, where two or more component carriers (CCs) are aggregated in order to support wider transmission bandwidths up to 100 MHz and for spectrum aggregation. In the Standard these carriers are LTE carriers. However, the principles in the Standard may be used to aggregate data carried by LTE carriers and white space spectrum carriers.

A terminal may simultaneously receive or transmit one or multiple component carriers depending on its capabilities. An LTE-Advanced terminal with reception capabilities for carrier aggregation can simultaneously receive on multiple component carriers. A modified terminal may simultaneously receive on LTE carriers and white space spectrum carriers.

Carrier aggregation is supported for both contiguous and non-contiguous component carriers with each component carrier limited to a maximum of 110 Resource Blocks in the frequency domain using the LTE Rel-8 numerology.

It is possible to configure a UE to aggregate a different number of component carriers originating from the same eNB and of possibly different bandwidths in the UL and the DL. Component carriers originating from the same eNB need not to provide the same coverage. A modified UE may simultaneously aggregate component LTE carriers and white space spectrum carriers.

The spacing between centre frequencies of contiguously aggregated component carriers may be a multiple of 300 kHz. This is in order to be compatible with the 100 kHz frequency raster of LTE Rel-8 and at the same time preserve orthogonality of the subcarriers with 15 kHz spacing. Depending on the aggregation scenario, the n*300 kHz spacing can be facilitated by insertion of a low number of unused subcarriers between contiguous component carriers.

Physical Layer

DL Control Signalling

The design principles for downlink control signalling of control region size, uplink and downlink resource assignments, and downlink Hybrid Automatic Repeat Request, HARQ ACK/NACK indication are described below.

For signalling of resource assignments for downlink (Physical Downlink Shared Channel, PDSCH) transmission, following mechanisms are supported,
- Physical Downlink Control Channel, PDCCH on a component carrier can assign
- PDSCH or Physical Uplink Shared Channel, PUSCH resources in one of multiple component carriers using the carrier indicator field, where Rel-8 DCI formats are extended with 1-3 bit carrier indicator field, and Rel-8 PDCCH structure (same coding, same CCE-based resource mapping) is reused.
- where the presence of carrier indicator field is semi-statically configured.

For signalling of downlink HARQ ACK/NACK indication, following principles may be applied.
- Physical Hybrid ARQ Indicator Channel, PHICH physical transmission aspects from Rel-8 (orthogonal code design, modulation, scrambling sequence, mapping to resource elements) are reused.
- PHICH is transmitted only on the downlink component carrier that was used to transmit the UL grant.
- At least in case that the number of downlink component carriers are more than or equal to that of uplink component carriers and no carrier indicator field is used, the Rel-8 PHICH resource mapping rule is reused.

UL Control Signalling

The design principles for uplink control signalling of HARQ ACK/NACK, scheduling request and channel state information (CSI) on Physical Uplink Control Channel, PUCCH are described below.

The Rel-10 PUCCH design supports up to five DL component carriers.

For signalling of HARQ ACK/NACK on PUCCH for downlink (PDSCH) transmission, following mechanisms are supported:
- All HARQ ACK/NACK for a UE can be transmitted on PUCCH in absence of PUSCH transmission.
- In general, transmission of one ACK/NACK for each DL component carrier transport block is supported.
- In case of power limitation, limited transmission of ACK/NACK for the DL component carrier transport blocks is supported.
- The design of the ACK/NACK resource allocation should consider performance and power control aspects, while not aiming to optimise for the case of large number of UEs being simultaneously scheduled on multiple DL component carriers.

Periodic CSI reporting on PUCCH is supported for up to five DL component carriers (which may include white space carriers). The CSI is semi-statically mapped onto one UE specific UL component carrier and the design follows the Rel-8 principles for CQI/PMI/RI, considering ways to reduce reporting overhead or to extend CSI payload.

User Plane

Structure

Compared to the Layer 2 structure of LTE Rel-8, the multi-carrier nature of the physical layer is only exposed to the MAC layer for which one HARQ entity is required per CC (which may be an LTE carrier or a white space carrier).

MAC

From a UE perspective, the Layer 2 aspects of HARQ are kept Rel-8 compliant unless modifications provide significant gains. There is one transport block (in absence of spatial multiplexing, up to two transport blocks in case of spatial multiplexing) and one independent hybrid-ARQ entity per scheduled component carrier. Each transport block is mapped to a single component carrier only where all possible HARQ retransmissions also take place. A UE may be scheduled over multiple component carriers (which may be LTE carriers or a white space carriers) simultaneously but at most one random access procedure shall be ongoing at any time.

Whenever a UE is configured with only one CC, Rel-9 DRX is the baseline. In other cases, the baseline is that the same DRX operation applies to all configured CCs (i.e. identical active time for PDCCH monitoring). When in active time, any CC may always schedule PDSCH on any other configured (and possibly activated) CC.

RLC

The Radio Link Control, RLC protocol of LTE Rel-8 also applies to carrier aggregation and allows LTE-A to handle data rate up to 1 Gbps. This data rate may be enhanced using white space carriers.

PDCP

The Packet Data Convergence Protocol, PDCP protocol of LTE Rel-8 also applies to carrier aggregation. Further enhancements (e.g. increased PDCP SN size) can be considered.

Control Plane
Structure

The C-Plane architecture of LTE Rel-8 also applies to carrier aggregation.

RRC Procedures
Connection Control

As in LTE Rel-8, the UE only has one RRC connection with the network. One cell—the "special cell"—provides the security input (one E-UTRAN Cell Global Identifier, ECGI, one PCI and one Absolute Radio Frequency Channel Number, ARFCN) and the NAS mobility information (e.g. TAI). There is only one "special cell" per UE in connected mode.

After RRC connection establishment to the "special cell", the reconfiguration, addition and removal of CCs can be performed by RRCConnectionReconfiguration including mobilityControlInfo (i.e. "intra-cell handover"). RRCConnectionReconfiguration without mobilityControlInfo can also be used for the addition of CCs, and for the removal of CCs with the exception of the CC corresponding to the "special cell".

At intra-LTE handover, the RRCConnectionReconfiguration with mobilityControlInfo (i.e. "handover command") can remove, reconfigure or add CCs for usage in the target cell.

When adding a new CC, dedicated RRC signalling is used for sending CCs' system information which is necessary for CC transmission/reception (similarly as in Rel-8 for handover).

Detection of failure of one CC by the UE does not necessarily trigger a connection re-establishment. RRC connection re-establishment triggers at the UE include:

1) The failure of all CCs on which the UE is configured to receive PDCCH;
2) The loss of all UL communication;
3) The indication from RLC that the maximum number of retransmissions has been reached (as in Rel-8).

Measurements

UE sees a CC as any other carrier frequency and a measurement object needs to be set up for a CC in order for the UE to measure it. Inter-frequency neighbour measurements (for which no serving cell is defined for measurement purposes) encompass all the carrier frequencies which are not configured as CCs.

Idle Mode Procedures

Idle mode mobility procedures of LTE Rel-8 also apply in a network deploying carrier aggregation.

REFERENCE SIGN LIST

1: mobile device
2: MSC
3: base station
4: base station
5: base station
6: MSC
7: base station
8: base station
9: base station
10: HLR
11: VLR
14: VLR
16: SGSN
18: SGSN
20: SIM
22: Core network
30: Geolocation database 30
32: internet
33: white space access point
34: white space communication module
35: controller
41: LTE band
42: LTE band
43: LTE band
44: white space band
45: white space band

What is claimed is:

1. A telecommunications system, comprising:
a cellular communication network operable to communicate with a mobile device via a cellular telecommunications network base station;
a white space communication system operable to communicate with the mobile device via a non-cellular white space access point, and
a white space access controller operable to determine availability of white space for the mobile device, to determine whether transmitting communications via available white space frequency spectrum for the mobile device will cause interference with a frequency channel that is neighbouring to the available white space frequency spectrum, and to selectively enable white space communication for the mobile device in response to a determination that transmitting communications via an available white space frequency channel will not cause interference in a frequency channel that is neighbouring to the available white space frequency channel.

2. The telecommunications system of claim 1, wherein the white space access controller accesses a database of white space availability to determine the availability of white space for the mobile device.

3. The telecommunications system of claim 2, wherein, upon white space communication for the mobile device being selectively enabled, the database of white space availability is updated to indicate that communication is occurring over white space spectrum for which white space communication for the mobile device has been enabled.

4. The telecommunications system of claim 2, wherein the white space access controller is implemented within the mobile device and accesses the database of white space availability via the cellular communications network to determine the availability of white space for the mobile device.

5. The telecommunications system of claim 4, wherein a network core of the cellular communication network and the database of white space availability are connected to the internet, and wherein, to determine the availability of white space for the mobile device via the cellular communications network, the white space access controller consults the database of white space availability via communication relayed from the mobile device to the database of white space availability by the cellular telecommunications network base station, the network core, and the internet and the database of white space availability returns a list of available white space channels in a vicinity of the mobile device via communication relayed from the database of white space availability to the mobile device by the internet, the network core, and the cellular telecommunications network base station.

6. The telecommunications system of claim 1, wherein the white space access controller is implemented within the mobile device and measures available white space spectrum in a vicinity of the mobile device via the mobile device to determine the availability of white space for the mobile device.

7. The telecommunications system of claim 6, wherein the white space access controller combines measurements of available white space spectrum in the vicinity of the mobile device via the mobile device with measurements of available white space spectrum by other mobile devices in the vicinity of the mobile device, an assessment of available white space spectrum in a vicinity of the white space access point, and a list of available white space channels in the vicinity of the mobile device returned from a database of white space availability to determine the availability of white space for the mobile device.

8. The telecommunications system of claim 1, wherein the non-cellular white space access point is in a vicinity of the mobile device, and the non-cellular white space access point performs an assessment of available white space spectrum in a vicinity of the white space access point to determine the availability of white space for the mobile device.

9. The telecommunications system of claim 4, wherein, upon the determination that transmitting communications via an available white space frequency channel will not cause interference in a frequency channel that is neighbouring to the available white space frequency channel, the database of white space availability transmits information for communicating via white space spectrum to the mobile device via the cellular communications network, and the white space access controller establishes a connection between the mobile device and the white space access point based on the information to selectively enable white space communication for the mobile device.

10. The telecommunications system of claim 1, wherein, upon white space communication for the mobile device being selectively enabled and the mobile device establishing a connection with the white space access point, the mobile device and the cellular telecommunications network base station exchange control data for controlling transmission of user data in white space communication between the white space access point and the mobile device.

11. The telecommunications system of claim 10, wherein communication protocols of the cellular communication network are utilized to control transmission of user data in the white space communication between the white space access point and the mobile device.

12. The telecommunications system of claim 10, wherein the mobile device includes a white space module that, upon the mobile device establishing a connection with the white space access point, analyses pilot signals transmitted by the white space access point to calculate white space status information that the mobile device transmits to the cellular telecommunications network base station, and the cellular telecommunications network base station transmits information for controlling transmission of user data in the white space communication to the white space access point and to the mobile device based on the white space status information.

13. The telecommunications system of claim 1, wherein, upon white space communication for the mobile device being selectively enabled and the mobile device establishing a connection with the white space access point, white space communication is transmitted only in the downlink from the white space access point to the mobile device.

14. The telecommunications system of claim 1, wherein, upon white space communication for the mobile device being selectively enabled and the mobile device establishing a connection with the white space access point, the mobile device exchanges data relating to a communication session via both the cellular telecommunications network base station and the white space access point.

15. The telecommunications system of claim 1, wherein the cellular telecommunications network base station is configured to coordinate white space communication for a plurality of mobile devices within a cell of the cellular telecommunications network base station that are each operable to communicate with the cellular telecommunications network base station and the white space access point.

16. A mobile telecommunications device, comprising:
a cellular communication module operable to communicate with a cellular telecommunications network base station via a transceiver;
a white space communication module operable to communicate with a non-cellular white space access point; and
a controller operable to determine availability of white space for the mobile telecommunications device by directing the cellular communication module to access a database of white space availability via the cellular telecommunications network base station and to enable white space communication based on an indication of the availability of white space provided from the database of white availability via the cellular telecommunications network base station.

17. The mobile telecommunications device of claim 16, wherein, in response to being accessed to determine the availability of white space, the database of white space availability returns a list of available white space channels in a vicinity of the mobile telecommunications device to the cellular telecommunications network base station, wherein the cellular telecommunications network base station is configured to determine a subset of white space channels from the list of available white space channels that will not cause interference in a neighbouring frequency and return the subset of white space channels to the cellular communication module, and wherein the controller enables white space communication based on the subset of white space channels.

18. The mobile telecommunications device of claim 16, wherein the controller is further operable to determine whether transmitting communications via available white space for the mobile telecommunications device will cause interference with a neighbouring frequency and to selectively enable white space communication in response to a determination that transmitting communications via of available white space will not cause interference in a neighbouring frequency.

19. The mobile telecommunications device of claim 18, wherein, upon the determination that transmitting communications via of available white space will not cause interference in a neighbouring frequency, the database of white space availability transmits information for communicating via white space spectrum to the mobile telecommunications device via the cellular telecommunications network base station, and the controller directs the white space communication module to establish a connection between the mobile telecommunications device and the white space access point based on the information for communicating via white space spectrum to selectively enable white space communication.

20. The mobile telecommunications device of claim 16, wherein the white space access controller combines the indication of the availability of white space provided from the database of white availability with at least one of measurements of available white space spectrum in the vicinity of the mobile telecommunications device via the white space communication module, measurements of available white space spectrum by other mobile devices in the vicinity of the mobile telecommunications device, and an assessment of available white space spectrum in a vicinity of the white space access point to determine the availability of white space.

21. The mobile telecommunications device of claim 16, wherein, upon white space communication being enabled and the white space communication module establishing a connection with the white space access point, the cellular communication module and the cellular telecommunications network base station exchange control data for controlling transmission of user data in white space communication between the white space access point and the mobile telecommunications device.

22. The mobile telecommunications device of claim 21, wherein communication protocols of a cellular communication network of the cellular telecommunications network base station are utilized to control transmission of user data in the white space communication between the white space access point and the mobile telecommunications device.

23. The mobile telecommunications device of claim 16, wherein, upon white space communication being selectively enabled and the white space communication module establishing a connection with the white space access point, white space communication is transmitted only in the downlink from the white space access point to the mobile telecommunications device.

24. The mobile telecommunications device of claim 16, wherein, upon white space communication being selectively enabled and the white space communication module establishing a connection with the white space access point, the mobile telecommunications device exchanges data relating to a communication session via both the cellular telecommunications network base station and the white space access point.

25. A method of operating a mobile telecommunications device having a cellular communication module operable to communicate with a cellular telecommunications network base station via a transceiver and white space communication module operable to communicate with a non-cellular white space access point, the method comprising:
    determining availability of white space for the mobile telecommunications device by directing the cellular communication module of the mobile telecommunications device to access a database of white space availability via the cellular telecommunications network base station;
    receiving an indication of available white space provided from the database of white space availability via the cellular telecommunications network base station; and
    enabling white space communication for the mobile telecommunication device based on the indication of available white space.

26. The method of claim 25, further comprising determining whether transmitting communications via any available white space frequency bands for the mobile telecommunications device will cause interference in a frequency channel that is neighbouring to the available white space frequency bands, and wherein enabling white space communication comprises selectively enabling white space communication in response to a determination that transmitting communications via an available white space frequency channel will not cause interference in a frequency channel that is neighbouring to the available white space frequency channel.

27. A mobile telecommunications device, comprising:
    a cellular communication module operable to communicate with a cellular telecommunications network base station;
    a white space communication module operable to communicate with a non-cellular white space access point; and
    a controller operable to enable white space communication for the mobile telecommunications device based on a determination of availability of white space, and
    wherein, upon white space communication being enabled and the white space communication module establishing a connection with the white space access point, the cellular communication module and the cellular telecommunications network base station exchange control data for controlling transmission of user data in white space communication between the white space access point and the mobile telecommunications device.

* * * * *